(12) United States Patent
Lamba et al.

(10) Patent No.: US 8,874,553 B2
(45) Date of Patent: Oct. 28, 2014

(54) ESTABLISHING "IS A" RELATIONSHIPS FOR A TAXONOMY

(71) Applicants: Digvijay Singh Lamba, Sunnyvale, CA (US); Omkar Deshoande, Mountain View, CA (US); Xiaoyong Chai, Mountain View, CA (US)

(72) Inventors: Digvijay Singh Lamba, Sunnyvale, CA (US); Omkar Deshoande, Mountain View, CA (US); Xiaoyong Chai, Mountain View, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 63 days.

(21) Appl. No.: 13/630,345

(22) Filed: Sep. 28, 2012

(65) Prior Publication Data
US 2014/0095478 A1 Apr. 3, 2014

(51) Int. Cl.
*G06F 17/30* (2006.01)
*G06F 17/27* (2006.01)

(52) U.S. Cl.
CPC .......... *G06F 17/3069* (2013.01); *G06F 17/277* (2013.01); *G06F 17/30654* (2013.01)
USPC ........................................................ 707/722

(58) Field of Classification Search
CPC .......... G06F 17/3069; G06F 17/30654; G06F 17/277
USPC ........................................................ 707/722
See application file for complete search history.

(56) References Cited

U.S. PATENT DOCUMENTS

| | | |
|---|---|---|
| 5,701,137 A | 12/1997 | Jancke |
| 5,754,938 A | 5/1998 | Herz et al. |
| 5,895,474 A | 4/1999 | Maarek |
| 6,108,698 A | 8/2000 | Tenev |
| 6,931,625 B1 | 8/2005 | Coad |
| 7,181,684 B2 | 2/2007 | Chittu |
| 7,644,085 B2 | 1/2010 | Miller |
| 7,661,076 B2 | 2/2010 | Seemann |
| 8,296,722 B2 | 10/2012 | Yoshihama |
| 8,478,699 B1 * | 7/2013 | Alfonseca et al. ............... 706/12 |
| 8,620,922 B2 | 12/2013 | Bird |
| 8,650,171 B2 | 2/2014 | Sacco |
| 2003/0218641 A1 | 11/2003 | Longobardi |
| 2004/0239683 A1 | 12/2004 | Chu |
| 2006/0037019 A1 | 2/2006 | Austin |

(Continued)

FOREIGN PATENT DOCUMENTS

EP 0984366 A2 3/2000
WO WO2010039893 A2 4/2010

*Primary Examiner* — Etienne Leroux
*Assistant Examiner* — Dara J Glasser
(74) *Attorney, Agent, or Firm* — David R. Stevens; Stevens Law Group

(57) ABSTRACT

Disclosed are methods for returning to a user an answer to the question "what is <string>." Concepts and classes to which the concepts belong are determined from a corpus, such as taxonomy. The concepts are mapped to categories according to the structure of the taxonomy. Homonyms for words are collected and scored according to likeliness of use. Concept vectors are assembled for the identified concepts based on articles in the corpus and social media usage. Words are evaluated for generic-ness and a generic score is associated therewith. In responding to a query, the generic-ness of the terms of the query is evaluated and additional context solicited if the terms are generic. Candidate homonym concepts for a string in the query are selected according to context vectors for the homonym concepts. One or more homonym concepts are selected and the one or more categories corresponding to these concepts are returned.

21 Claims, 6 Drawing Sheets

(56) References Cited

U.S. PATENT DOCUMENTS

| | | |
|---|---|---|
| 2006/0150169 A1 | 7/2006 | Cook |
| 2007/0233656 A1* | 10/2007 | Bunescu et al. .................. 707/3 |
| 2011/0106807 A1* | 5/2011 | Srihari et al. ................. 707/739 |
| 2011/0295895 A1 | 12/2011 | Musgrove |
| 2012/0109753 A1* | 5/2012 | Kennewick et al. ....... 705/14.58 |

* cited by examiner

ESTABLISHING "IS A" RELATIONSHIPS FOR A TAXONOMY

RELATED APPLICATIONS

This application claims priority to U.S. Provisional Application Ser. No. 61/695,274, entitled WIKIGRAPH TO TREE MIGRATION PROVISIONAL, filed Aug. 30, 2012, which is hereby incorporated herein by reference.

This application is related to U.S. application Ser. No. 13/622,975, filed Sep. 19, 2012, U.S. application Ser. No. 13/630,325, filed Sep. 28, 2012 and U.S. application Ser. No. 13/630,369, filed Sep. 28, 2012. All applications are incorporated herein by reference for all purposes.

BACKGROUND

1. Field of the Invention

This invention relates to systems and methods for establishing "is a" relationships between terms of a query and a category in a taxonomy.

2. Background of the Invention

It is important in the art of search engines to provide results that are relevant to an input query. Relevance of a search result is often measured by some sort of relatedness of terms in the query to a document to be returned as a search result. For example, the inclusion of some or all of the terms in the query in the document may be used to measure relevance. However, relevance is a very broad attribute and does not contemplate the nature of the relationship between the query and the search result.

Disclosed herein are methods for establishing "is a" relationships between a search query and concepts in a taxonomy.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
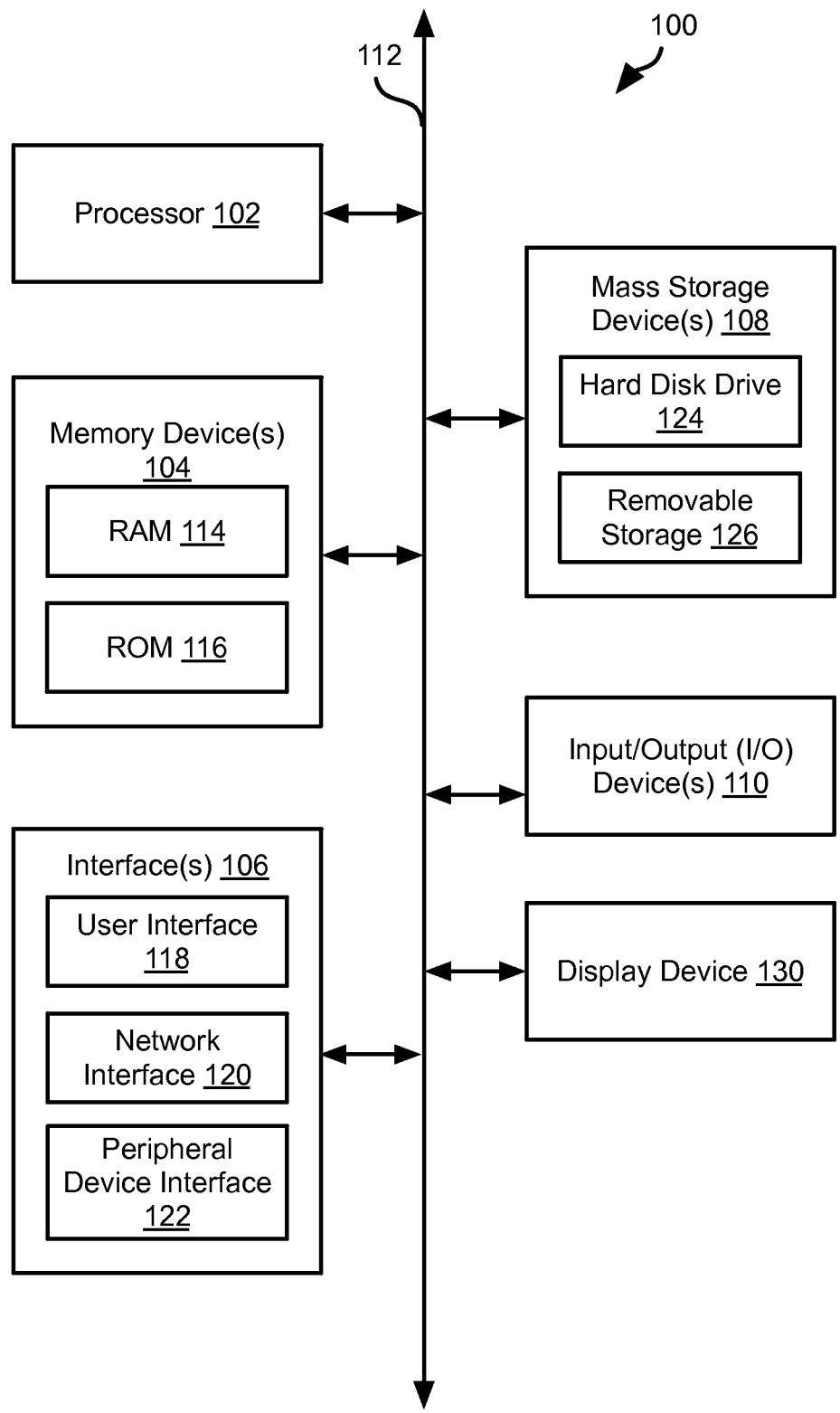
FIG. 1 is a block diagram of a computing device suitable for implementing embodiments of the present invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods. In particular, the invention has been developed to provide apparatus and methods for establishing "is a" relationships between concepts in a taxonomy and a category.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a block diagram illustrating an example computing device 100. Computing device 100 may be used to perform various procedures, such as those discussed herein. Computing device 100 can function as a server, a client, or any other computing entity. Computing device can perform various monitoring functions as discussed herein, and can execute one or more application programs, such as the application programs described herein. Computing device 100 can be any of a wide variety of computing devices, such as a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer readable media, such as magnetic tapes, magnetic disks, optical disks, solid-state memory (e.g., Flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments. Example interface(s) 106 include any number of different network interfaces 120, such as interfaces to local area networks (LANs), wide area networks (WANs), wireless networks, and the Internet. Other interface(s) include user interface 118 and peripheral device interface 122. The interface(s) 106 may also include one or more user interface elements 118. The interface(s) 106 may also include one or more peripheral interfaces such as interfaces for printers, pointing devices (mice, track pad, etc.), keyboards, and the like.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 100, and are executed by processor(s) 102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 2:
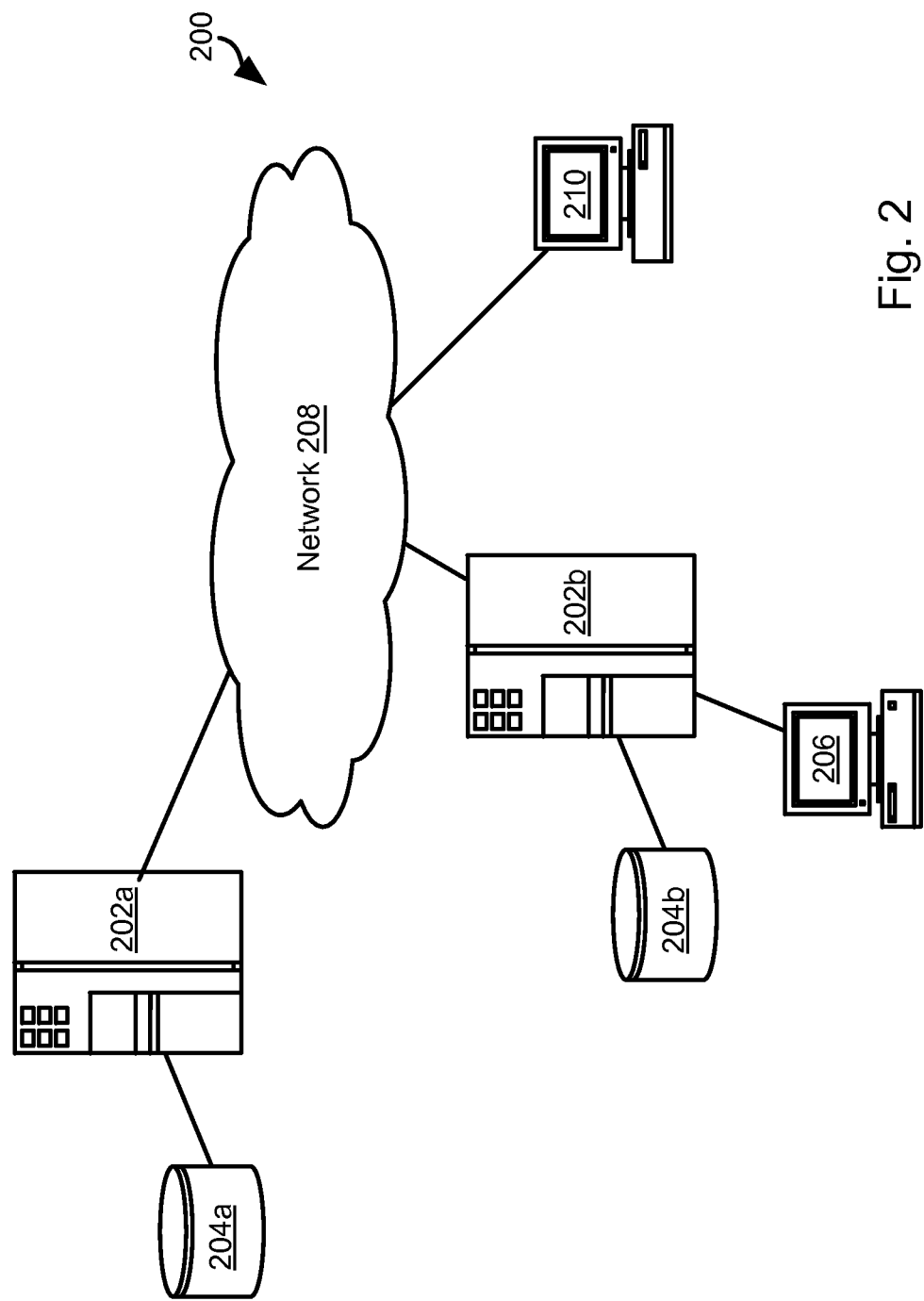
FIG. 2 is a block diagram of a network environment suitable for implementing embodiments of the present invention.

FIG. 2 illustrates an example of a computing environment 200 suitable for implementing the methods disclosed herein. In some embodiments, a server 202a provides access to a database 204a in data communication therewith. The database 204a may store a directed graph. For example, the database 204a may store the Wikipedia™ corpus or some other corpus of documents hyperlinked to one another to define a directed graph. The server 202a may provide access to the database 204a to various users. For example, the server 202a may implement a web server for receiving requests for data stored in the database 204a and formatting requested information into web pages. The web server may additionally be operable to receive information and store the information in the database 204a. Although a single database 204a and server 202a are shown, the data accessed by users may be distributed across multiple databases 204a and accessed by means of multiple servers 202a.

A server 202b may be associated with another entity providing information services, such as responses to queries for information. The server 202b may be in data communication with a database 204b. The database 204b may store information for use in responding to queries. In particular, the database 204b may store a taxonomy obtained through a transformation of the directed graph from the databases 204a. In some embodiment, both the directed graph and taxonomy are generated by the same entity and stored and accessed using the same hardware. An operator may access the server 202b by means of a workstation 206, that may be embodied as any general purpose computer, tablet computer, smart phone, or the like.

The server 202a and server 202b may communicate with one another over a network 208 such as the Internet or some other local area network (LAN), wide area network (WAN), virtual private network (VPN), or other network. A user may access data and functionality provided by the servers 202a, 202b by means of a workstation 210 in data communication with the network 208. The workstation 210 may be embodied as a general purpose computer, tablet computer, smart phone or the like. For example, the workstation 210 may host a web browser for requesting web pages, displaying web pages, and receiving user interaction with web pages, and performing other functionality of a web browser. The workstation 210, workstation 206, servers 202a-202b, and databases 204a, 204b may have some or all of the attributes of the computing device 100.

Figure 3:
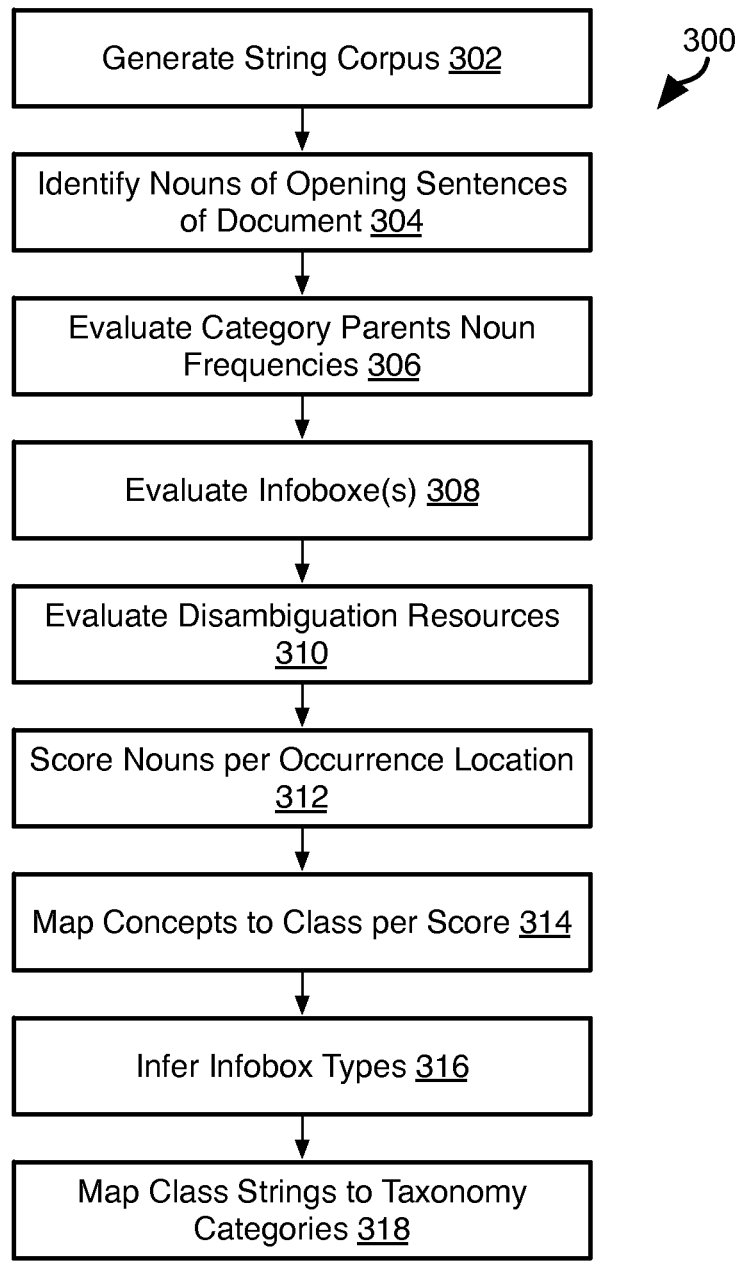
FIG. 3 is a process flow diagram of a method for generating mappings between concepts and categories in accordance with an embodiment of the present invention.

FIG. 3 illustrates a method 300 for generating a mapping between concepts and one or more categories according to an "is a" relationship, i.e., "<concept> is a <category>" or "Britney Spears" is a "musical artist." The method 300 may include generating 302 a corpus of strings, where each string represents a concept. A concept can be a person, animal, organism, activity, organization, or other physical or abstract entity. The concepts may be associated with articles or a corpus of articles in a reference work providing information on the concepts. For example, the corpus of articles may be an encyclopedia, such as the Wikipedia™ corpus. In some embodiments, multiple corpuses of documents may be used to generate a collection of concepts. Any corpus of documents may be used and multiple corpuses can be combined, such as a product catalog, dictionary or other reference corpus, a collection of scholarly articles, and the like. For purposes of this disclosure, a corpus may be a combination of a number of corpuses of documents.

Generating 302 a string corpus may include extracting strings from documents or sections of documents of the corpus that represent the subject of the document or section, respectively. For example, title field of a document or section may be extracted as a concept string for the string corpus.

The following steps of the method 300 may be used to identify a class to which the concept associated with a concept string belongs for the strings of the string corpus. For example, the method 300 may include identifying 304 nouns of opening sentences of the document corresponding to the concept. For example, in an encyclopedia, such as Wikipedia, the first sentence of an article is likely to specify a potential "is a" relationship for the concept that is the subject of the article because the first sentence defines what the concept 'is.' In some embodiments, one or more opening sentences may be processed using natural language processing (NLP) to tag each word with a corresponding part of speech (noun, verb, preposition, adverb, etc.).

In some embodiments, analysis of the first sentence may proceed as outlined below. The first few words (e.g. 3 or 4), of a sentence before the first verb such as a form of the verb "to be" may be ignored as unlikely to include a noun reflecting an "is a" relationship for the concept. Following these words nouns may be identified but proper nouns discarded. The remaining nouns may be noted up until a comma following a noun other than a proper noun is found. The remaining nouns may then be used as candidate nouns that may have an "is a" relationship with the concept. Adjectives applicable to the candidate nouns may be ignored. In order to facilitate later analysis, these candidate nouns may be evaluated with respect to synonym lists and a canonical form of the nouns chosen. The canonical form may simply be one of the synonyms that is chosen to represent a particular group of synonyms. A synonym list may be any such list generated in any manner. For example, Wordnet™ provides lists of such synonyms.

The method 300 may further include evaluating 306 nouns in listings of category parents for the concept. In some reference works, articles may include listings of categories to which the concept belong. These listings may be a source of candidate nouns that may represent "is a" relationships for the concept. Accordingly, nouns referenced in listing of category parents may be identified according to NLP (natural language processing) and used as candidate nouns. As for candidate nouns identified in the opening sentence, the candidate nouns may be evaluated with respect to synonym lists and a candidate synonym selected in the same manner. In particular, candidate nouns identified in the category parent listings may be compared with candidate nouns selected from the opening sentence as described above. A frequency with which nouns, including the candidate nouns from the opening sentence, occur in the names of the category parents may be calculated. The candidate nouns from both the first sentence and category parent names may be used as candidate classes for the concept. Nouns encountered in the first sentence, category parents, or elsewhere may be de-pluralized prior to comparisons.

In many reference corpuses, such as encyclopedias, there may be infoboxes that include brief summaries of relevant facts for the concept that is the subject of an article. In particular, Wikipedia articles often include such infoboxes. In some reference corpuses, different classes of infoboxes are used for different types of articles. For example, the type of information listed in an infobox for a famous person will be different than the type of information listed in an infobox for a species of animal. Accordingly, the class of infobox may be evaluated 308 and used as a candidate class for the concept.

The method 300 may further include evaluating 310 disambiguation resources for a concept. In some reference corpuses some portion of the corpus or an article of the corpus may indicate possible meanings for a term and reference articles for each of those meanings. For example, disambiguation of the term "apple" may include meanings "apple: fruit," "apple: computer and software company," and "apple: recording label." As shown in this example, a disambiguation text may include a brief explanation or indicator of the meaning. This brief explanation or indicator may include a class identifier that can be used as a candidate class for the concept. Accordingly, the method 300 may evaluate 310 disambiguation resources by identifying the disambiguation text corresponding to the concept and identifying nouns or class identifiers in this text and using the identified nouns or classes as candidate classes for the concept. This may include selecting the canonical synonym for each of these candidate nouns or classes as described above.

Each of the candidate classes identified in the foregoing steps may be assigned 312 a score. The score may be based on where the candidate class was identified, e.g., in the first sentence, infobox, category parents, or disambiguation text. In the case of candidate classes identified in the first sentence, the score may additionally be augmented according to occurrence of these classes in the text identifying category parents. In some embodiments, candidate classes may additionally be scored according to the number of concepts mapped to the hierarchy. When establishing "is a" relationships, classes to which few concepts are mapped are typically not accurately characterized as relating to these concepts in this manner. The number of concepts mapped to each class may be based on one or more of mappings of concepts to classes in a first iteration of the method 300, a human generated mapping of concepts to classes for a test set, the set of concepts having infobox classes associated therewith, or some other source of mapping of concepts to classes.

A class of the candidate classes may then be selected and mapped 314 to the concept. For example, the candidate class with the highest score, as computed by summing the above-referenced scores, may be mapped 314 to the concept. In some embodiments, the infobox class may be a more reliable source of a class for a concept. Accordingly, if an infobox is found in the article for the concept, the class of the infobox may be mapped 314 to the concept without regard to score, otherwise the highest scoring candidate class may be selected for mapping 314.

In some embodiments, infobox classes may be inferred 316 for concepts with corresponding articles that lack infoboxes. For example, for each article with an infobox class, attributes of the articles may be used to train an algorithm to identify other articles that are likely to belong to the same infobox class. Any machine learning algorithm may be used using the articles with infoboxes as a training set. Likewise, any attribute of an article may be used as an input to the algorithm. For example, the list of candidate classes as identified according to the foregoing steps may be used. Likewise, words occurring in the articles analyzed and contextual information may also be used. These inferred infobox classes may be used to perform mapping 314 of a concept or for other use in other algorithms.

In some embodiments, the classes mapped 314 to a concept may be strings that are themselves subsequently mapped 318 to a specific category, where the category has a "is a" relationship to the concept. The possible categories may be a smaller taxonomy or hierarchy of concepts that are suitable for "is a" relationships with entities. In some embodiments, the concepts of a corpus may be organized into a hierarchy and the categories to which classes can be mapped may also be nodes in this hierarchy. As an example, a taxonomy may be generated from a corpus of interconnected documents, such as Wikipedia or other corpus of documents, using the methods disclosed in U.S. application Ser. No. 13/622,975, filed Sep. 19, 2012, which is hereby incorporated herein by reference in its entirety.

In such embodiments, a class may be mapped 318 to one of these categories by selecting a node in the taxonomy of which N percent, e.g. 80%, of the concepts mapped 314 to the class are descendants. In addition, or as an alternative, the category may be chosen as the node at which the number of concepts belonging to the class located under the node is less than a threshold amount smaller than the number of concepts mapped to the class that are located below a next higher node in the hierarchy. Other mapping schemes may also be used to map a class to a category.

Figure 4:
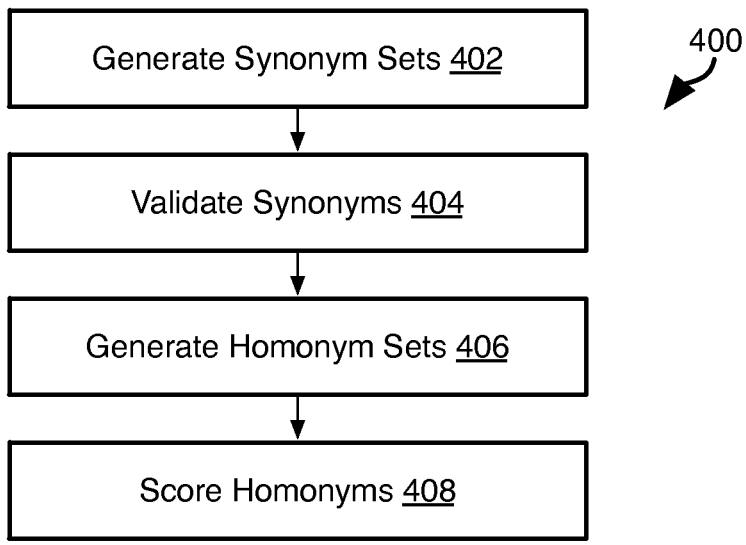
FIG. 4 is a process flow diagram of a method for identifying synonym and homonyms lists in accordance with an embodiment of the present invention.

FIG. 4 illustrates a method 400 for assembling lists of synonyms and homonyms associated with a concept for use in responding to queries as described herein or for other purposes. The method 400 may include generating 402 a set of candidate synonyms. This may include using explicitly defined lists, such as the Wordnet synonym library. Candidate synonyms may also be gathered from the reference corpus. In some reference works, such as an encyclopedia, resources are included to resolve synonyms. Accordingly, candidate synonyms may be extracted from these resources. In Wikipedia, for example, an article may include links to other pages, some of which are redirects to synonyms that might represent what a user is actually looking for. However, in some instances these redirects may include links to related topics that are not synonyms. Accordingly, concepts with redirects to a concept may be added to the list of candidate synonyms for the concept and be subject to a validation step 404. Synonyms derived from authoritative synonym lists may or may not be subject to the validation step 404. In some embodiments, only redirects, e.g., links, to separate articles may be added to the candidate synonyms whereas links to a different portion of the article for a concept will not.

Various methods may be used to validate 404 a candidate synonym. For example, for the concept that is the subject of the method 400, a web search for the canonical synonym representing the concept may be performed. Web searches for the candidate synonyms may also be performed. The search results for the canonical synonym and the candidate synonyms may then be compared. In particular, one or both of the text of the search result entries and the URLs (uniform resource locators) of the search results. Each of the candidate synonyms may receive a score representative of the similarity of the text of search result entries to those of the canonical synonym. Another score may be generated for a candidate synonym with a value corresponding to similarity of the URLs of the search results of the candidate synonym to those of the canonical synonym. Another score for a particular candidate synonym may also be generated in accordance with a number of occurrences of the canonical synonym in the search results for that candidate synonym. Some or all of these scores may be evaluated with respect to each synonym and candidate synonyms kept as synonyms or discarded according to the score. For example, some or all of the three scores may be summed, or weighted and summed, and the sum compared to a threshold. Those candidate synonyms with scores above the threshold may be validated and those with scores below the threshold discarded. The authoritative synonyms and validated synonyms may then be used as the set of synonyms for a concept.

The method 400 may further include determining homonyms for a string, such as a string corresponding to a particular concept or a synonym for a concept. This may include generating 406 a set of candidate homonyms. The set of homonyms may be derived from various sources including authoritative sets of homonyms from a reference. Candidate homonyms may also be derived from the corpus. For example, an encyclopedia, such as Wikipedia, may include disambiguation resources that enable a user to select a desired meaning for a string with multiple homonyms. Accordingly, meanings listed in these disambiguation resources may be added to the set of candidate homonyms. The meanings may be mapped to a canonical synonym and the canonical synonym added to the list of candidate homonyms.

In instances where a string is very likely confused with a homonym, the article for a concept represented by the string may include a "hat note" that lists one or more alternative meanings, e.g. "this article is about apple, the fruit. For the company Apple, Inc., please see . . . . " The meanings listed in these hat notes may also be added to the set of candidate homonyms and may be given high priority. Articles may also include explicit clarifications of the meaning of a term, e.g., "X, not to be confused with X the Y." Homonym meanings may therefore be extracted from these expressions as well and added to the set of candidate homonyms. In addition to exact matches (after depluralization and removal of non-alphabetic characters, for example), meanings for non-exact matching strings may also be considered as candidate homonyms based on for example, a small edit distance from a string representing a concept, being an expansion of an acronym, or an acronym or abbreviation of another term.

Candidate homonyms may be scored 408 and candidate homonyms that have low scores, i.e., scores below a threshold, may be eliminated. Scores for a homonym may be a combination of a plurality of signals. For example, a signal may reflect a score based on where the homonym was extracted. For example, homonyms extracted from hat notes may be given a score (which may be relatively large due to the very indicative nature of hat notes), homonyms from disambiguation resources may be given a different score, and so on for the above-referenced sources of homonym meanings. A score for a candidate homonym meaning may additionally include a signal reflecting popularity of the meaning. For example, Wikipedia gathers data regarding views of articles in the corpus. Articles corresponding to particular candidate homonym meanings that are rarely accessed are less likely to be the meaning corresponding to a string with multiple homonyms. Accordingly, a signal corresponding to number of views of a Wikipedia article corresponding to a particular candidate homonym meaning may also be used as part of the score for each homonym meaning.

The candidate homonym meanings for a string and their corresponding scores may be stored for later use. In some embodiments, only the homonym meanings with scores above a threshold are stored for later use or only the homonyms with the top N scores are stored for a string for later use.

Figure 5:
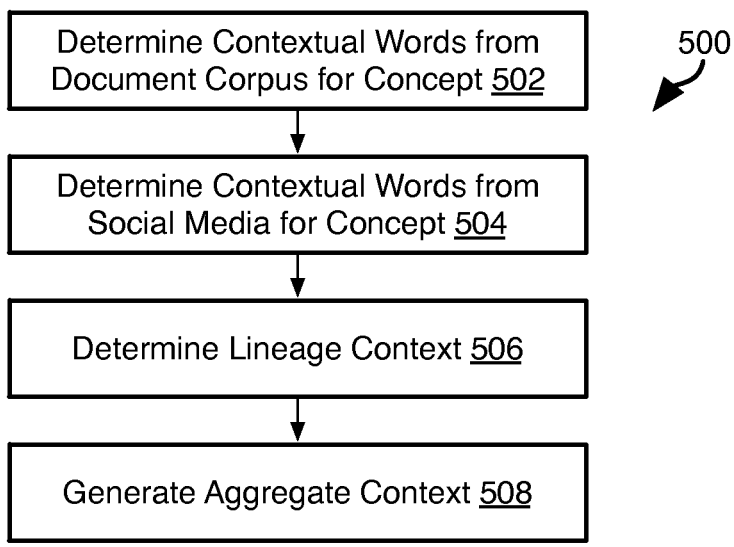
FIG. 5 is a process flow diagram of a method for generating a context for a concept in accordance with an embodiment of the present invention.

FIG. 5 illustrates a method 500 for determining a context for a concept. The method 500 may include determining 502 usages of contextual words from the document corpus for the concept. For example, where there is a main article for a concept, the strings that occur in the article and the number of times they occur may be added to a corpus concept vector, where each entry of the vector is a string and a frequency metric for that string. In some embodiments, the value stored with each string may be an inverse document frequency (IDF) score calculated as the number of documents in the entire corpus divided by the number of documents in which the string occurs in the corpus.

The method 500 may additionally include determining 504 contextual strings from social media postings. For example, the last N (e.g. 1000) documents generated on a social media site may be analyzed as a corpus. For example "documents" may include tweets on Twitter™ or postings on Facebook™, LinkedIn™, Foursquare, or the like. For example, concepts may be identified in each document. This may include analyzing the document to identify concepts using some or all of the methods described in U.S. patent application Ser. No. 13/300,524, entitled "PROCESSING DATA FEEDS," filed Nov. 18, 2011, which is hereby incorporated herein by reference in its entirety.

For each identified concept, a social concept vector may be generated. A concept vector for a concept may list some or all words that occur in documents referencing the concept along with a frequency metric. The frequency metric may be a ratio of the number of time a word occurs in documents containing a concept divided by the total number of times the word occurs in the corpus. In some embodiment, only the top N words with the highest frequency metric may be included in concept vector for a concept. These top N words represent those words that are most distinctive for the concept.

The method 500 may additionally include determining 506 a lineage context vector for a concept. As noted above, a corpus may have a tree structure or be converted to a tree, such as a rooted, spanning tree structure. In such embodiments, word usage data may be generated for a lineage based on a node and its descendants. For example, for a node representing a class with sub-classes and entities as descendants, each represented by a document such as a reference article, a concept vector for that node may be generated that includes a frequency metric for the most distinctive terms in the document for that node and all descendent nodes for the node. For example, a ratio of the number of times a word is used in the node and its descendants may be divided by the total number of times the word is used in the entire corpus may be used as the frequency metric.

An aggregate concept vector may then be generated 508 for the concept based on some or all of the corpus concept vector, social concept vector, and lineage concept vector. For example, a cosine ratio may be calculated for these vectors. The aggregate concept vector may have the same form of the input vectors, namely a string with a frequency metric or score representing the affinity of the string to the concept with which the concept vector is associated. In some embodiments, logistic regression may be used to determine weightings for the frequency metrics different concept vectors when combining them. In some embodiments, following aggregation of the three input vectors, the vector may be pruned to eliminate low scoring strings. For example, only the top N strings may be retained or only those strings with scores above a threshold. In addition to the aggregate vector, a popularity metric may be stored along with the scores for each string. The popularity metric may be a simple measure of the global popularity of each string in a corpus, such as a stream of social media documents as described above, the corpus of documents forming a reference work, or the like. Popularity may be a measure of the number of occurrences of the string in one or more corpuses or the number of times documents containing the string are accessed.

Figure 6:
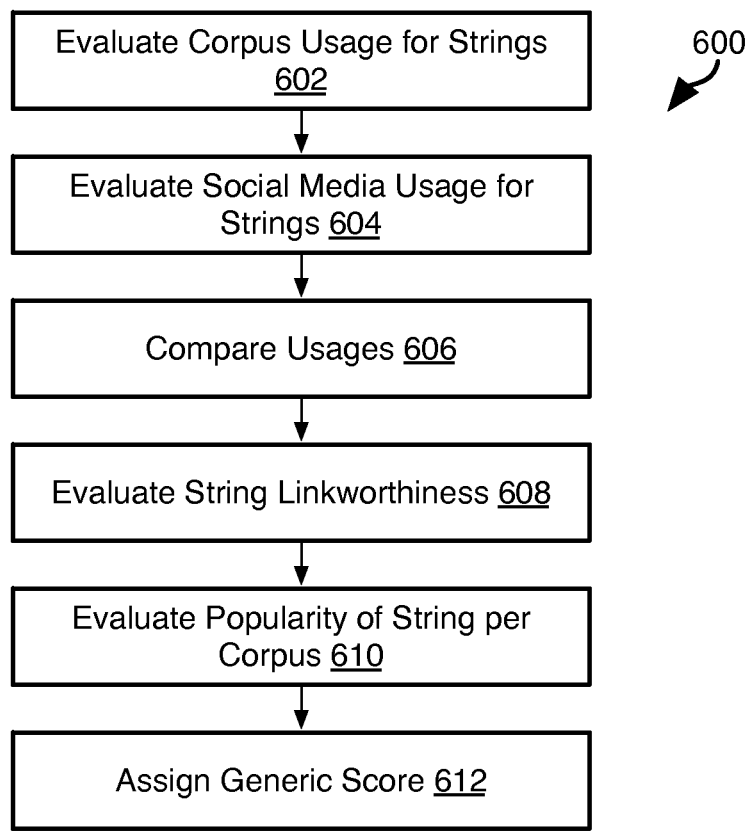
FIG. 6 is a process flow diagram of a method for evaluating the generic-ness of a term in accordance with an embodiment of the present invention.

FIG. 6 illustrates a method 600 for evaluating how generic a string is for use in responding to queries as described below. A generic term is one that does not communicate significant contextual information. For example terms such as "the," "up" or "of," etc. Generic terms may also include words that aren't simple parts of speech but that are so commonly used in so many contexts that they do not, of themselves, communicate any particular concept.

The method 600 may include evaluating 602 usages of strings in a corpus, evaluating 604 social media usage of the same strings, and comparing 606 the usage in the corpus and in current social media content. Examples of social media content include the last N (e.g. 1000) tweets on Twitter™ or postings on Facebook™, LinkedIn™, Foursquare, or the like.

Evaluating 602, 604 usage of strings in the corpus and social media, respectively, may include evaluating context information for each string. For example, a vector may be generated for each string being evaluated with the entries being strings, such as words, that occur in the same documents as the string being evaluated and the frequency with which they co-occur with that string. In some embodiments, the frequency may be the ratio of the number of times the strings of the vector occur with the string being evaluated divided by the total number of times the string of the vector occurs in the corpus or social media. In some embodiments evaluating 602, 604 usage of a string being evaluated may include mapping the string to a concept and defining concept vectors for the corpus and social media as described hereinabove. In such embodiments, comparing 606 may include comparing the concept vectors of the corpus and the current social media content.

A string may be assigned a usage score that increases with the differences between the vectors, either the usage frequency vector or concept vectors discussed above, of the current social media content and the corpus. Alternatively, rather than a metric of how generic a string is, the distinctiveness of a string may be measured, such that the usage score would decrease with the differences between the vectors. Comparing the vectors based on social media and the corpus may include for a given string in the vectors evaluating a difference in the scores in the vectors. The differences, or absolute values of the differences, for each string in the vectors may then be summed as a metric of the similarity of usage of the string being evaluated.

The method 600 may further include evaluating 608 "linkworthiness" of a concept. Determining linkworthiness of a string may include determining how likely the word is to be included in a link, i.e., the text that a user clicks to navigate to a different web page. For example, a linkworthiness score for a string may be calculated as a ratio of the number of times a string is included in a link divided by the total number of times the string is included in a corpus. For purposes of linkworthiness, the corpus used may be a reference work or current social media content, such as tweets or postings on one or more social media sites.

The method 600 may further include evaluating 610 traffic for a string in a corpus. For example, where a reference work is online, such as Wikipedia, page views and other statistics may be published for articles in the reference. Accordingly, the popularity, as measured by page views may be retrieved and used to evaluate how generic a term is. In general, more popular articles are less likely to be generic.

The method 600 may include assigning 612 a generic score to a string based on analysis described above. For example, the difference score determined at step 606, the linkworthiness score, and the popularity score may be combined to determine a generic score. The weights applied to each of these values may be determined according to logistic regression. For example, a set of test strings with generic scores specified by an analyst may be subject to the analysis of the method 600 and logistic regression used to weight each of the values described above in order to reproduce accurate generic scores for the test strings. The generic score as determined for each string may be stored in associate with the string for later use as described below. Inasmuch as the generic score depends in part on current social media content, the generic score may be updated periodically or for each query received.

Figure 7:
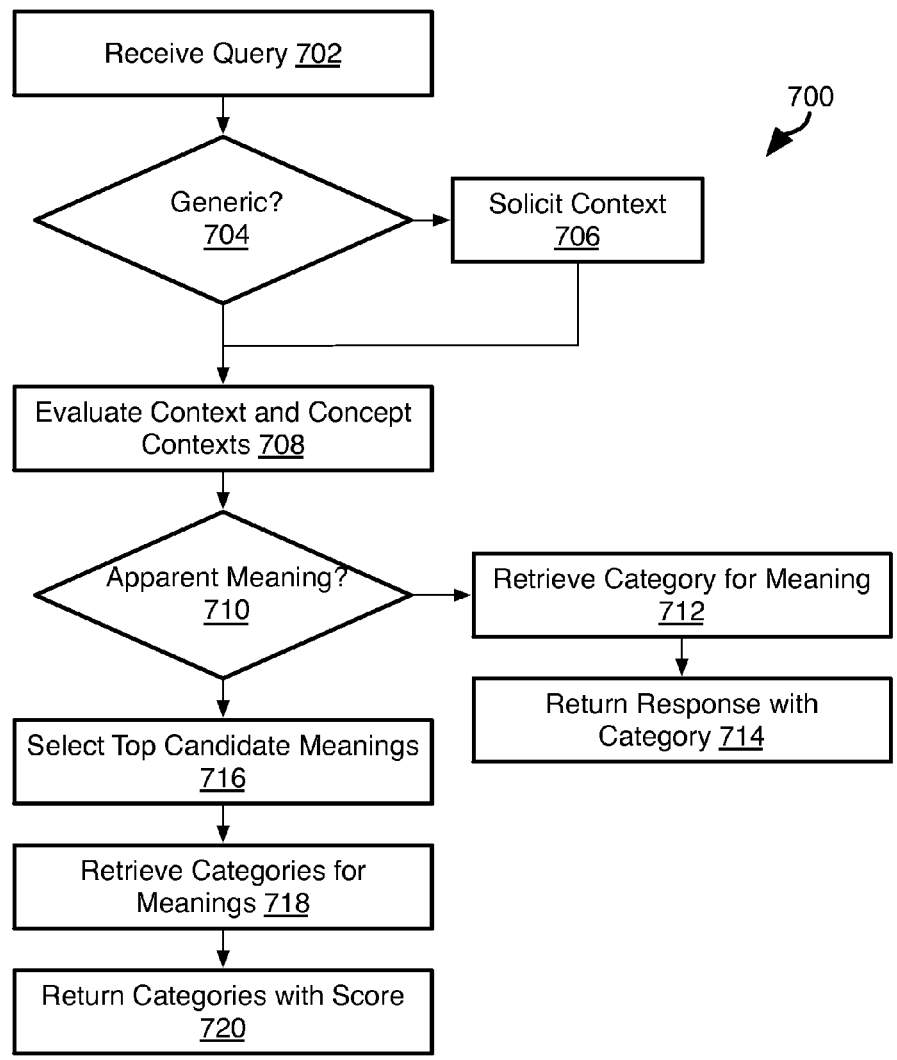
FIG. 7 is a process flow diagram of a method for responding to a query in accordance with an embodiment of the present invention.

FIG. 7 illustrates a method 700 for responding to queries. The method 700 may make use of pre-computed information in accordance with some or all of the foregoing methods. The method 700 may include receiving 702 a query from a user, such as from a user's computing device. As noted above, the methods described herein are particularly helpful for determining "is a" relationships. Accordingly, a query may be of the form "what is <string>." A query may also include one or more terms supplied as context for <string>.

The words of the query may be evaluated 704 to determine whether the query is generic. This may include evaluating a generic score of the words of the query. A query may be deemed generic if none of the terms of the query have a generic score below a threshold, where a higher generic score indicates a more generic term. Where a low score indicates a term is more generic, a query may be deemed generic if none of the terms have a generic score above a threshold. In some embodiments, the generic-ness of a query may be characterized based on a combination of the generic score for the constituent terms of the query, for example, a sum or average of the generic scores.

If the query is found 704 to be generic, then additional context may be solicited 706 and received from the querying user. A solicitation for additional context may include displaying, or transmitting for display a request for one or more words describing the context in which the query term or terms are used or to which they relate.

If the query is not found 704 to be generic, then the context of the query may be evaluated with respect to pre-computed string contexts. For example, the <string> for which an "is a" relationship is requested may have a number of meanings associated therewith. Accordingly, the homonyms associated with the string may be analyzed. In particular, the concepts associated with each homonym may be retrieved and the concept vectors, such as the concept vectors computed above, may be compared to the contextual words provided with the query. Where the context of the query has a high correlation to the context vector of a homonym meaning then the meaning of <string> is apparent. As noted above, homonym meanings may have a popularity score associated therewith. A <string> may be deemed to have an apparent meaning despite a lack of clear correlation with a particular concept vector if one of the homonym meanings has a high popularity.

In some embodiments, evaluating whether a <string> has an apparent meaning may include evaluating the context vectors for the meanings with respect to the query context. For example, for each word in the query context that is included in the concept vector for a meaning, the score for that meaning may be augmented, either by a fixed amount or by the score recorded in the concept vector for that word. The score for a meaning may also be augmented in accordance with the popularity of that homonym meaning. The scores for each meaning may be one or both of compared to each other and to a threshold. For example, if a score for a meaning is above a threshold it may be selected as the apparent meaning. If there are multiple meanings with scores above the threshold, the scores may be compared to each other, if one of them is larger than the others or is a threshold amount or percentage above the others, it may be selected as the apparent meaning.

In any case, if a homonym meaning for <string> is found 710 to have an apparent meaning, then the category mapped to the concept of the apparent homonym meaning, as precomputed as described above, may be retrieved 712 and a response to the query is returned 714. Returning a response may include displaying or transmitting for display the retrieved 712 category. A query response may be formatted as "<string> is a <category>." In some embodiments a confidence score corresponding to the score computed above for the apparent homonym meaning may be returned as well.

If no apparent meaning for <string> is found 710, then top candidate homonym meanings may be selected 716. This may include selecting the homonym meanings with the top N scores based on the query context and the concept vectors as described above. Alternatively, up to N homonym meanings with scores above a threshold may be selected 716 as the top candidates. The categories previously selected for the selected meanings (concepts) may then be retrieved 718 and returned 720 as a response to the querying user by displaying or transmitting for display the selected categories. Returning 720 the categories for the selected meanings may include returning a confidence score for each category. The confidence score may be the score computed for the homonym meanings in order to determine 710 an apparent meaning, or may be a function of this value.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method establishing is-a relationships, the method comprising:
   receiving, by a server, a query from a user, the query including a string and one or more context words;
   generating a first co-occurrence vector indicating co-occurrence statistics for terms in a reference corpus with respect to the string;
   generating a second co-occurrence vector indicating terms and co-occurrence statistics for terms in current social media postings;
   determining a difference between the first and second co-occurrence vectors;

determining that the difference between the first and second co-occurrence vectors exceeds a threshold condition;

in response to determining that the difference between the first and second co-occurrence vectors exceeds a threshold condition, requesting from the user additional context words;

retrieving homonym concepts corresponding to the string and concept vectors for each homonym concept;

comparing the concept vectors to the one or more context words;

selecting at least one homonym concept according to the comparison;

retrieving from a category-concept mapping database at least one category for the selected at least one homonym concept, the category-concept mapping database establishing is-a relationships between a plurality of categories and a plurality of concepts; and transmitting, by the server, the retrieved at least one category for display to the user.

2. The method of claim 1, further comprising:

evaluating generic-ness of the string and zero or more context words; and if the string and zero or more context words are excessively generic, soliciting more context words.

3. The method of claim 1, further comprising generating the concept vectors for the homonym concepts by, for each homonym concept:

determining a first word usage for an article in a reference corpus corresponding to the homonym concept;

determining a second word usage for documents using the homonym concept in current social media documents; and combining the first and second word usages to generate the concept vector for the homonym concept.

4. The method of claim 3, wherein the first and second word usage include first and second vectors, respectively, the first and second vectors having entries including words and a corresponding frequency metric; and wherein combining the first and second word usages comprises combining the first and second vectors.

5. The method of claim 4, wherein combining the first and second vectors comprises performing a cosine ratio of the first and second vectors.

6. The method of claim 4, wherein the reference corpus is a taxonomy and the article is a node in the taxonomy.

7. The method of claim 6, further comprising generating a lineage vector by combining concept vectors for any descendent articles of the article corresponding to the homonym concept in the taxonomy; and wherein combining the first and second word vectors to generate the concept vector for the homonym concept further comprises combining the first and second vectors and the lineage vector.

8. A system for establishing is-a relationships, the system comprising one or more processors and one or more memory devices operably coupled to the one or more processors and storing executable and operational data effective to cause the one or more processors to:

receive a query from a user, the query including a string and one or more context words;

generate a first co-occurrence vector indicating co-occurrence statistics for terms in a reference corpus with respect to the string;

generate a second co-occurrence vector indicating terms and co-occurrence statistics for terms in current social media postings;

determine a difference between the first and second co-occurrence vectors;

determine that the difference between the first and second co-occurrence vectors exceeds a threshold condition;

in response to determining that the difference between the first and second co-occurrence vectors exceeds a threshold condition, request from the user additional context words;

retrieve homonym concepts corresponding to the string and concept vectors for each homonym concept;

compare the concept vectors to the one or more context words;

select at least one homonym concept according to the comparison;

retrieve from a category-concept mapping database at least one category for the selected at least one homonym concept, the category-concept mapping database establishing is-a relationships between a plurality of categories and a plurality of concepts; and transmit the retrieved at least one category for display to the user.

9. The system of claim 8, wherein the executable and operational data are further effective to cause the one or more processors to:

evaluate generic-ness of the string and zero or more context words; and if the string and zero or more context words are excessively generic, soliciting more context words.

10. The system of claim 8, wherein the executable and operational data are further effective to cause the one or more processors to generate the concept vectors of the homonym concepts by, for each homonym concept:

determining a first word usage for an article in a reference corpus corresponding to the homonym concept;

determining a second word usage for documents using the homonym concept in current social media documents; and combining the first and second word usages to generate the concept vector for the homonym concept.

11. The system of claim 10, wherein the first and second word usage include first and second vectors, respectively, the first and second vectors having entries including words and a corresponding frequency metric; and wherein the executable and operational data are further effective to cause the one or more processors to combine the first and second word usages comprises combining the first and second vectors.

12. The system of claim 11, wherein the executable and operational data are further effective to cause the one or more processors to combine the first and second vectors by performing a cosine ratio of the first and second vectors.

13. The system of claim 11, wherein the reference corpus is a taxonomy and the article is a node in the taxonomy.

14. The system of claim 13, wherein the executable and operational data are further effective to cause the one or more processors to generate a lineage vector by combining concept vectors for any descendent articles of the article corresponding to the homonym concept in the taxonomy; and wherein the executable and operational data are further effective to cause the one or more processors to combine the first and second word vectors to generate the concept vector for the homonym concept by combining the first and second vectors and the lineage vector.

15. A computer program product for establishing is-a relationships, the computer program product being embodied in a non-transitory computer readable storage medium and comprising computer instructions for:

receiving a query from a user, the query including a string and one or more context words;

generating a first co-occurrence vector indicating co-occurrence statistics for terms in a reference corpus with respect to the string;

generating a second co-occurrence vector indicating terms and co-occurrence statistics for terms in current social media postings;

determining a difference between the first and second co-occurrence vectors;

determining that the difference between the first and second co-occurrence vectors exceeds a threshold condition;

in response to determining that the difference between the first and second co-occurrence vectors exceeds a threshold condition, requesting from the user additional context words;

retrieving homonym concepts corresponding to the string and concept vectors for each homonym concept;

comparing the concept vectors to the one or more context words;

selecting at least one homonym concept according to the comparison;

retrieving from a category-concept mapping database at least one category for the selected at least one homonym concept, the category-concept mapping database establishing is-a relationships between a plurality of categories and a plurality of concepts; and transmitting the retrieved at least one category for display to the user.

16. The computer program product of claim 15, further comprising computer instructions for:

evaluating generic-ness of the string and zero or more context words; and if the string and zero or more context words are excessively generic, soliciting more context words.

17. The computer program product of claim 15, further comprising computer instructions for generating the concept vectors of the homonym concepts by, for each homonym concept:

determining a first word usage for an article in a reference corpus corresponding to the homonym concept;

determining a second word usage for documents using the homonym concept in current social media documents; and combining the first and second word usages to generate the concept vector for the homonym concept.

18. The computer program product of claim 17, wherein the first and second word usage include first and second vectors, respectively, the first and second vectors having entries including words and a corresponding frequency metric; and wherein combining the first and second word usages comprises combining the first and second vectors.

19. The computer program product of claim 18, wherein combining the first and second vectors comprises performing a cosine ratio of the first and second vectors.

20. The computer program product of claim 18, wherein the reference corpus is a taxonomy and the article is a node in the taxonomy.

21. The computer program product of claim 20, further comprising computer instructions for generating a lineage vector by combining concept vectors for any descendent articles of the article corresponding to the homonym concept in the taxonomy; and wherein combining the first and second word vectors to generate the concept vector for the homonym concept further comprises combining the first and second vectors and the lineage vector.

* * * * *

UNITED STATES PATENT AND TRADEMARK OFFICE
CERTIFICATE OF CORRECTION

| | | |
|---|---|---|
| PATENT NO. | : 8,874,553 B2 | Page 1 of 1 |
| APPLICATION NO. | : 13/630345 | |
| DATED | : October 28, 2014 | |
| INVENTOR(S) | : Digvijay Singh Lamba | |

It is certified that error appears in the above-identified patent and that said Letters Patent is hereby corrected as shown below:

On the Title Page Item (63) should read,

Related U.S. Application Data

Provisional Application No. 61/695,274, filed on August 30, 2012.

Signed and Sealed this
Third Day of March, 2015

Michelle K. Lee
*Deputy Director of the United States Patent and Trademark Office*